(12) United States Patent
Didier

(10) Patent No.: US 9,667,946 B2
(45) Date of Patent: May 30, 2017

(54) METHOD FOR AUTHENTICATING AN IMAGE CAPTURE OF A THREE-DIMENSIONAL ENTITY

(71) Applicant: MORPHO, Issy-les-Moulineaux (FR)

(72) Inventor: Bernard Didier, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 14/432,986

(22) PCT Filed: Oct. 15, 2013

(86) PCT No.: PCT/EP2013/071561
§ 371 (c)(1),
(2) Date: Apr. 1, 2015

(87) PCT Pub. No.: WO2014/060441
PCT Pub. Date: Apr. 24, 2014

(65) Prior Publication Data
US 2015/0281673 A1    Oct. 1, 2015

(30) Foreign Application Priority Data
Oct. 18, 2012  (FR) .................................... 12 59962

(51) Int. Cl.
*H04N 13/02*    (2006.01)
*G06K 9/00*    (2006.01)
(Continued)

(52) U.S. Cl.
CPC ......... *H04N 13/026* (2013.01); *G06F 3/0346* (2013.01); *G06K 9/00255* (2013.01);
(Continued)

(58) Field of Classification Search
CPC ..... G06T 7/004; G06T 7/0065; G06T 15/205; G06K 9/00671; G06K 9/221; G06K 9/899
See application file for complete search history.

(56) References Cited

U.S. PATENT DOCUMENTS

2007/0226509 A1* 9/2007 Senga ................ G06K 9/00899
713/176
2011/0254942 A1* 10/2011 Suzuki ............... G06K 9/00221
348/77
2012/0063671 A1 3/2012 Yamada et al.

FOREIGN PATENT DOCUMENTS

JP    2003 178306 A    6/2003
JP    2004 362079 A    12/2004

OTHER PUBLICATIONS

Li, "Encyclopedia of Biometrics," Jan. 1, 2009, Springer, pp. 908-915.
(Continued)

*Primary Examiner* — Obafemi Sosanya
(74) *Attorney, Agent, or Firm* — Muncy, Geissler, Olds & Lowe, P.C.

(57) ABSTRACT

A method of authenticating the capture of an image of a three-dimensional entity is provided, including the steps of generating a series of images of the entity with the help of an optical sensor, associating each image with information representative of the position of the sensor at the moment at which it generated the image, and determining whether there is consistency between two images of the series by verifying whether there is consistency between an apparent movement of the optical sensor as determined by comparing characteristic points visible in the two images and an estimated real movement of the optical sensor as determined by comparing
(Continued)

information representative of three-dimensional positions of the optical sensor at the moments when it generated the two images.

9 Claims, 2 Drawing Sheets

(51) Int. Cl.
  *G06F 3/0346* (2013.01)
  *G06T 7/32* (2017.01)
(52) U.S. Cl.
  CPC ............ *G06K 9/00899* (2013.01); *G06T 7/32* (2017.01); *H04N 13/0282* (2013.01)

(56) References Cited

OTHER PUBLICATIONS

Wechsler, "Reliable Face Recognition Systems," Jan. 1, 2007, Springer, pp. 193-196.

Pan et al., "Liveness Detection for Face Recognition," *Recent Advances in Face Recognition*, Jun. 1, 2008, pp. 109-0124, Retrieved from the Internet URL:http://cdn.intechopen.com/pdfs/5896/InTech-Liveness-detection_for_face_recognition.pdf.

Bundesministerium Der Justiz Ed—Bundesministerium Der Justiz: "Handbuch der Rechtsförmlichkeit, Teil B: Allgemeine Empfehlungen für das Formulieren von Rechtsvorschriften; 1: Sprachliche Gestaltung von Gesetzen und Rechtsverordnungen," Handbuch Der Rechtsformlichkeit, Bundesanzeiger Verlag, pp. 1-38, Jan. 1, 2008, Retrieved from the Internet URL:http://hdr.bmj.de/page_b.1.html.

Burton, "A Model of Human Face Recognition," *Localist Connectionists Approaches to Human Cognition*, Jan. 1, 1989, pp. 75-100.

D.C. Hay et al., "Normality and pathology in cognitive functions," Jan. 1, 1982, Academic Press.

Ma et al., "Chapter 11: Step-by-Step Building a 3-D Model from Images," *An Invitation to 3-D Vision: From Images to Geometric Models*, Jan. 1, 2004, Springer, pp. 375-411.

Kollreider et al., "Evaluating Liveness by Face Images and the Structure Tensor," Fourth IEEE Workshop on Automatic Identification Advanced Technologies, Oct. 17-18, 2005, pp. 75-80.

* cited by examiner

METHOD FOR AUTHENTICATING AN IMAGE CAPTURE OF A THREE-DIMENSIONAL ENTITY

The invention relates to the field of methods of capturing an image of a three-dimensional entity and in particular to methods of enabling the capture of such an image to be authenticated.

BACKGROUND OF THE INVENTION

It is known how to capture an image of a three-dimensional entity with the help of an optical sensor. Nevertheless, the Applicant has found that it is difficult to determine whether the captured image was indeed taken by actually positioning the optical sensor to face the three-dimensional entity. Patent document US2007/226509A1 discloses methods for authenticating a person.

OBJECT OF THE INVENTION

An object of the invention is thus to provide a method of authenticating the capture of an image of a three-dimensional entity, and also to provide a portable computer terminal for implementing such a method.

SUMMARY OF THE INVENTION

To this end, in a first aspect, the invention provides a method of authenticating the capture of an image of a three-dimensional entity, the method comprising the following steps:
generating a series of images of the entity with the help of an optical sensor moved around the entity;
associating each image of the series of images with information representative of the position of the optical sensor in three-dimensional space at the moment it generated the image, the position being determined relative to a given three-dimensional reference frame; and
determining whether there is consistency between at least two images of the series by verifying whether there is consistency between:
an apparent movement of the optical sensor as determined by comparing characteristic points visible in the two images; and
an estimated real movement of the optical sensor as determined by comparing information representative of three-dimensional positions of the optical sensor at the moments when it generated the two images.

By means of the invention, if consistency is found between the apparent movement calculated from the captured images and the real movement estimated with the help of the sensor, it can then be concluded that the series of images of the three-dimensional entity was indeed generated by actually moving the optical sensor around the real three-dimensional entity.

The invention thus provides means for authenticating the capture of an image of a three-dimensional entity.

In particular, by means of the invention, it is possible to detect the situation in which the captured image is obtained by moving the optical sensor in front of a two-dimensional image that has already been taken of a three-dimensional object. Under such circumstances, the method of the invention makes it possible to observe that there is no consistency between the real movement of the sensor and the apparent movement observed in the images. The apparent movement differs from the real movement of the optical sensor and there is no correlation/consistency between the movements. In the absence of any such correlation/consistency, the three-dimensional capture of an image is not authenticated.

In order to understand the invention, it should be observed that:
the term "apparent movement" is used to mean an estimated movement of the optical sensor determined by observing the relative movement between characteristic points visible in a plurality of images in the series;
the term "estimated real movement" is used to mean a movement of the optical sensor between the moments at which the two images were captured, this movement being determined by measuring three-dimensional movements of the optical sensor relative to a given reference frame (which reference frame may optionally be stationary relative to the three-dimensional entity being observed); and
the term "three-dimensional entity" is used to mean an article occupying a volume, as contrasted to an article that is flat and two-dimensional, the three-dimensional entity being such that its orthogonal projection onto a plane varies as a function of the orientation of the three-dimensional entity relative to the plane.

In a particular implementation, the authentication method of the invention includes an additional step in which an authentication indicator is generated for the capture of the image of the three-dimensional entity, this indicator depending on the consistency as determined between the apparent movement of the optical sensor between the two images and the estimated real movement of the optical sensor between the two images.

In a second aspect, the invention also provides a method of identifying an individual making use of the above-described method of detecting consistency. This method of identifying the individual comprises the steps of:
1) generating the series of images by moving the optical sensor around an entity that is a portion of the individual to be identified; and
2) searching for a match between:
identification data generated from physical characteristics of the individual taken from at least one of the images of the series of images; and
individual identification data contained in a previously registered database, the previously identification data previously registered in the database being associated with at least one identity of an individual; and then
3) generating an identification indicator of the individual to be identified depending on said search for a match.

In this identification method, the three-dimensional entity is an individual to be identified, and a series of images of the individual is captured by moving the optical sensor around a portion of the individual, such as the individual's hand or head. At least one of the images in the series is used for determining individual identification data representative of certain physical characteristics of the individual. If the captured image(s) in the series of images is/are indeed authenticated as forming part of an image capture of a three-dimensional entity, then it can be deduced that the identification data of the individual is indeed representative of the individual to be identified, which data can then be used for identifying the individual.

It should be observed that the physical characteristics used for identifying the individual may be shapes, relative positions of portions of the individual such as the corners of the lips, the end of the nose, nostrils, corners of the eyes, tips of the ears, fingerprints, or they may be the result of image processing (such as, for example, the responses to local filtering).

The identification data derived from the captured image is compared with identification data contained in a previously registered database in order to search for matching identification data. As a function of the result of this search for a match, an identification indicator for the individual is generated.

Typically, the identification indicator takes a first given value if there is a sufficient match between the identification data derived from the image(s) and the identification data contained in the database. The identification data takes a second value that is different from the first value when there is insufficient matching between the identification data derived from the images and the identification data contained in the database.

Several methods are known to the person skilled in the art in the field of biometrics for searching for a match between identification data derived from one or more images and identification data registered in a database. In some of those methods, it may be considered that matching is sufficient if the number of similarities between the identification data derived from the images and the individual identification data contained in the database is greater than a predetermined threshold.

Conversely, if the number of similarities is less than the predetermined threshold, it is considered that the matching is insufficient, so the identification indicator takes the second value. This second value may be a message such as "individual not identified".

In a third aspect, the invention relates to a portable computer terminal such as a smart phone. The terminal is essentially characterized in that it is adapted to perform the method of the invention of authenticating the capture of an image of a three-dimensional entity, and preferably also the identification method of the invention.

To this end, the portable computer terminal comprises:
an optical sensor adapted to generate a series of images of an individual taken by moving the optical sensor around at least a portion of the individual; and
means for generating information characteristics of the three-dimensional positions of the optical sensor relative to a given three-dimensional reference frame.
The terminal further comprises:
means arranged to associate each image of a plurality of images in the series of images with information representative of the three-dimensional position of the optical sensor at the moment it generated the image, each position being determined with the help of said means for generating information representative of the positions of the optical sensor; and
means for determining consistency between two images of the series of images, these means being arranged to verify whether consistency exists between:
an apparent movement of the optical sensor determined by comparing characteristic points visible in these two images; and
an estimated real movement of the optical sensor determined by comparing information representative of the three-dimensional positions of the optical sensor at the moment at which it generated these two images.

The terminal is particularly advantageous since it makes it possible, at little cost and using common telephones having optical and position sensors, to perform authenticated image captures of a three-dimensional entity.

Such a terminal preferably includes read means for reading a database containing identification data of at least one individual. The database may be stored in a memory of the terminal and/or in a memory that is remote from the terminal, the read means being arranged to read the data in the database.

In this implementation, the terminal also comprises:
1) analysis means for analyzing the series of images and arranged to generate identification data from physical characteristics of at least one individual visible in at least one of the images of the series of images;
2) means for searching for a match between:
individual identification data generated by the analysis means; and
individual identification data read from the database using said read means; and
3) means for generating an identification indicator of the individual to be identified depending on said search for a match.

In this implementation, the terminal is adapted not only to capture images of a three-dimensional entity, i.e. of the individual to be identified, but is also adapted to use at least one of the images in the authenticated capture to identify the individual in question. The identification of the individual is thus made secure against a risk of having a false identification obtained by presenting an image of an individual to the optical sensor. With the invention, it is only the real presence of the individual in front of the optical sensor that can lead to identification.

In this implementation of the invention, the terminal may also comprise means for conditioning the execution of at least one computer application as a function firstly of the consistency determined between the two images of the series of images and secondly as a function of the identification indicator of the individual.

These means for conditioning the execution of at least one application may relate to managing rights to access the computer terminal. Thus, if the identification indicator takes a first value, access to the terminal or to an application of the terminal is prevented. Otherwise, if the identification indicator takes the second value, access to the terminal or to the application is authorized.

BRIEF DESCRIPTION OF THE DRAWINGS

Other characteristics and advantages of the invention appear clearly from the following description given by way of non-limiting indication and made with reference to the accompanying drawings, in which.

DETAILED DESCRIPTION OF THE INVENTION

Figure 1:
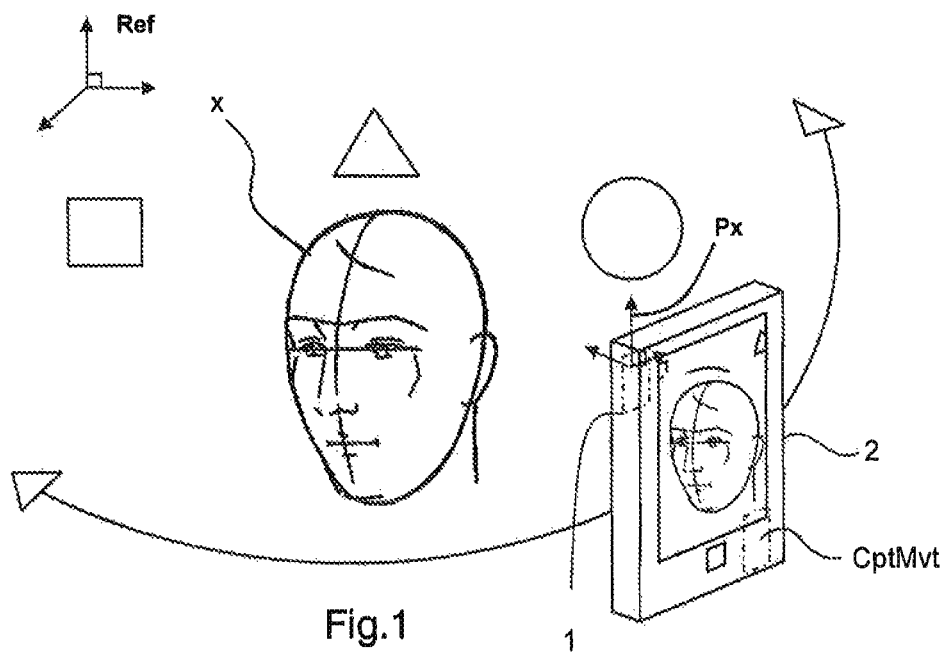
FIG. 1 shows a terminal of the invention capturing a series of images of a three-dimensional entity by pivoting the optical sensor of the terminal around the entity.

As mentioned above, the invention relates to a method of authenticating an image capture of a three-dimensional entity. In FIGS. 1 to 4, the three-dimensional entity shown is the head of an individual who is to be identified with an identification method of the invention. The authentication method serves to ensure that the individual X for identifying is indeed present in front of an optical sensor 1.

In order to implement these methods, use is made of a computer terminal 2 which, in this example, is a mobile telephone 2. The terminal has man/machine interface means to enable the user X to interact with the terminal 2 and to enable the terminal to give information to the user. Specifically, these interface means comprise a screen, a keyboard, and/or touch means that may optionally be superposed on the screen.

The terminal also has a processor and at least one memory storing a computer program arranged to execute the methods of the invention. The processor is itself connected to the man/machine interface means in order to execute the methods.

The telephone 2 has an optical sensor 1 such as a camera 1 and means CptMvt for generating information representative of positions in three-dimensional space of the optical sensor 1 relative to a given three-dimensional reference frame Ref. This three-dimensional reference frame Ref may be of various kinds, such as a terrestrial reference frame having a vertical axis, an axis pointing north, and an axis pointing east or west. The origin of the reference frame may for example be positioned in arbitrary manner by the terminal. For example, the reference frame may be centered on a characteristic point of an individual's face as detected by the terminal, or it may be centered on the location where the terminal 2 is to be found at the moment it is capturing an image is in a series S of images.

In order to generate information representative of positions Pa, Pb, Pc, Pd, and Pe in the three-dimensional space of the optical sensor 1, the terminal may use data coming from sensors incorporated therein and that are in fixed positions relative to the optical sensor 1.

Specifically, the three-dimensional position information of the sensor 1 may be generated with the help of:
  one or more inertial data sensors such as an accelerometer CptMvt; and/or
  at least one rotation data sensor such as a rate gyro and/or at least one free gyro sensor; and/or
  one or more orientation sensors such as a magnetic sensor constituting a compass for detecting terrestrial magnetic north; and/or
  one or more level sensors for determining the angle of inclination of the optical sensor relative to a terrestrial vertical axis; and/or
  one or more location sensors of a geolocation system such as the system for geolocation relative to satellites and/or for geolocation relative to fixed antennas.

The reference frame Ref and its origin are selected mainly as a function of the type of position sensor used for determining the three-dimensional movement of the optical sensor. Thus, by way of example, this reference frame may be determined relative to elements constituting a satellite geolocation system or relative to a network of relay antennas in a telephone communications system.

The authentication method may include a start instruction consisting in requesting the user to move the terminal around the individual X in order to capture images of that individual. During the movement of the terminal around the individual, the sensor 1 generates a series S of images of the individual X and of the background. Association means incorporated in the terminal associates each image of the series S of images with information representative of the three-dimensional position of the optical sensor 1 at the moment it generated the image.

Figure 2:
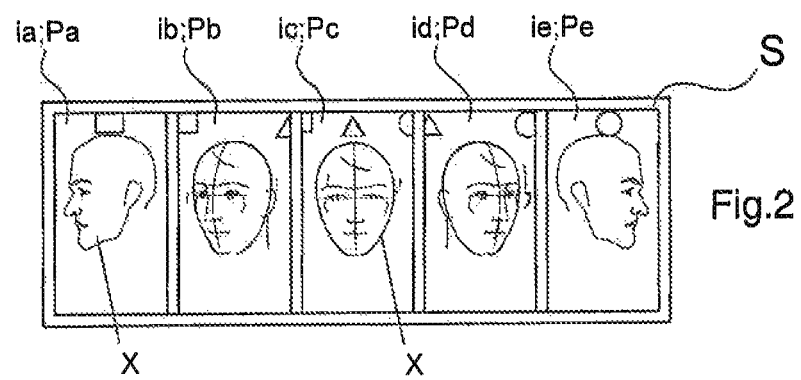
FIG. 2 shows the series of images captured by the terminal in FIG. 1.
Figure 3:
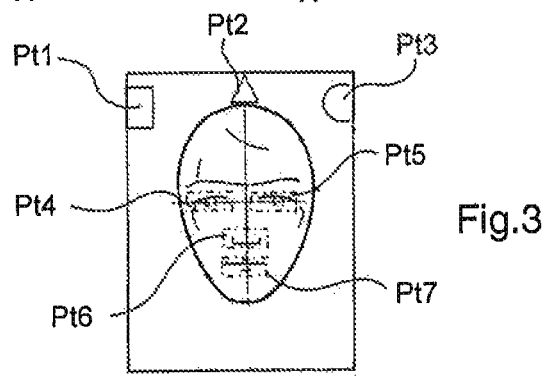
FIG. 3 shows an authenticated image derived from a three-dimensional image capture.

Thus, as can be seen in FIG. 2, the data relating to the respective real positions Pa, Pb, Pc, Pd, and Pe of the camera relative to the reference frame Ref is associated with the images ia, ib, ic, id, and ie in the series S of images.

These images, positions, and associations between images and positions are stored in memories of the terminal.

Means for determining consistency between two images in the series of images are also incorporated in the terminal and connected to the memories of the terminal. These means may comprise an application for detecting consistency that is executed by a processor of the terminal and that has the function of verifying whether there is consistency between:
  the apparent movement of the optical sensor 1 as determined by making comparisons between characteristic points Pt1, Pt2, Pt3, Pt4, Pt5, Pt6, and Pt7 visible in at least two of the images ia, ic of the series S; and
  the estimated real movement of the optical sensor 1 as determined by comparing information representative of three-dimensional positions Pa, Pb, Pc, Pd, and Pe of the optical sensor 1 at the moments that it generated those two images ia, ic.

Some of the characteristic points Pt4, Pt5, Pt6, and Pt7 visible in the images ia and ic are used for determining the apparent movement of the optical sensor 1 between the two images ia and ic. These characteristic points are physical characteristics of the individual to be identified that are visible in these two images ia and ic.

Ideally, these physical characteristics are also used for seeking a match between:
  identification data Idx generated from physical characteristics of the individual X derived from at least one of the images ic in the series S of images; and
  identification data Idn relating to one or more individuals and contained in the previously registered database.

The volume of calculation needed for implementing the methods is thus reduced by using a common set of physical characteristics of the individual both for determining the movement of the optical sensor between two images and for identifying that individual.

It should be observed that at least some of the characteristic points visible in the images that are used for determining the apparent movement of the optical sensor may include characteristics Pt1, Pt2, Pt3 of the images ia, ib, ic, id, and ie that are visible in the background of the individual X to be identified.

The apparent movement of the optical sensor relative to the reference frame Ref is determined by observing the relative movements of characteristics that are visible in at least two images.

For example, using image analysis methods, it is known how to determine the apparent movement of an optical sensor 1 relative to a fixed reference frame Ref, relative to the head of the individual X, or relative to the background. Thus, between image ia and image ic, it can be seen that the optical sensor 1 has pivoted through 90° about the entity X.

A first way of determining whether there has been an apparent movement through 90° about the individual X between the images ia and ic may be to observe the movement of the "square" background characteristic relative to the individual X. Thus, an algorithm may determine that since the square is visible behind the individual X in the image ia and then to the left of the individual in the image ic, and since it has remained continuously on the same side of the background "triangle", the sensor 1 has indeed pivoted through 90° relative to an axis of the reference frame Ref.

In another method, by observing the apparent movements of characteristic points of the face relative to one another in the images ia and ic, it is also possible to determine this rotation through 90°. For example, in the image ia, the nose Pt6 is visible under the left eye Pt5, which means that the individual X is in left profile. In the image ic, X's left eye Pt5 is visible to the right of an axis passing through the nose Pt6 and is equidistant with the right eye Pt4. It can thus easily be deduced that the image ic is a face view and that as a result, between ia and ic, there has been an apparent rotation of the sensor through 90° relative to the individual X and relative to the reference frame Ref. An algorithm can thus recognize characteristic points of the face of the individual X, and as a function of their apparent relative movements it can determine the apparent movement of the sensor 1 relative to the individual X or relative to the reference frame Ref.

From the real three-dimensional positions Pa and Pc associated with the images ia and ic, it is known that the optical sensor 1 has indeed rotated through 90° between the images ia and ic.

Between the images ia and ic, it can indeed be determined that there is an apparent movement of the sensor through 90° relative to the entity X and an estimated real movement through 90° relative to the reference frame Ref. The apparent and real movements are thus consistent and the capture of the series of images ia, ib, ic, id, and ie is indeed authenticated.

Figure 4:
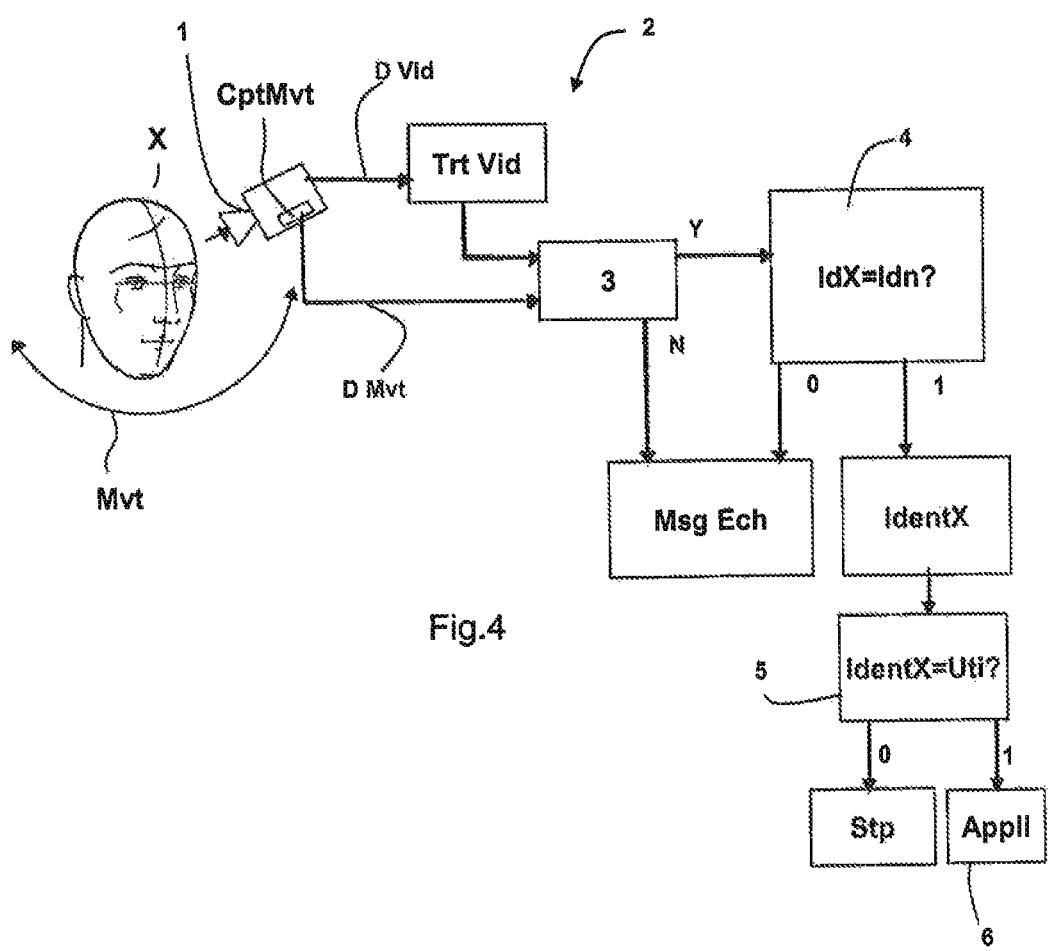
FIG. 4 is a diagram of the functional steps necessary for implementing the authentication and identification methods of the invention.

As can be seen in particular in FIG. 4, the terminal 2 carrying the optical sensor 1 and the movement sensor CptMvt generates a stream of positioning data DMvt enabling the estimated real movement between two images to be determined, and a stream of video data DVid serving to transmit the images of the series. These streams may be separate or combined using an image data coding protocol giving a time stamp for each image together with a corresponding viewpoint position relative to the reference frame Ref.

The video stream DVid is conveyed to a video processor module that determines the apparent movements between at least some of the images in the series. A consistency determination module 3 compares the real and apparent movements between images.

When consistency is not determined, then an authentication fail message MsgEch is issued, and under such circumstances it may be decided not to seek to identify the individual X.

Otherwise, if consistency is observed, then a value Y is sent to an identification module 4 suitable for comparing:
  the identification data Idx generated from the physical characteristics Pt4, Pt5, Pt6, and Pt7 of the individual X taken from at least one of the images in the series S; and
  the identification data Idn for at least one individual contained in a database.

It should be observed that the data Idx generated from the characteristics of the individual X that are visible in the images are preferably generated by the video processor module TrtVid.

If a match is found by the means 4 between the identification data Idn contained in the database and the data Idx relating to the individual X, then the module 4 generates an identification indicator IdentX specifying that the individual X has indeed been identified. This indicator IdentX may be an identifier of the individual X such as a file containing characteristics specific to the individual, such as name, and an ID photograph.

An additional module 5 of the terminal may be used to determine whether the individual identified by the indicator IdentX is indeed also an authorized user Uti of the terminal. If authorized, the use of the application Appli (application module 6) is authorized. Otherwise, if the individual X is not an authorized user Uti, then an instruction Stp is issued to stop or block the terminal. The identification method of the invention may thus be used to unblock a standby screen application of the terminal.

The invention is not limited to the above description and may be implemented by comparing a plurality of apparent movements with a plurality of measured/observed real movements between a plurality of pairs of images in a series of captured images.

It should be observed that the method may also include capturing a plurality of series of images of the three-dimensional entity, e.g. for the purpose of taking an average between the results of the consistency determination.

The determination of consistency between apparent and real movements may also be performed by taking account of error margins in determining each of the movements. In particular, the estimated movements need not be exactly identical, providing they still lie within an acceptable error margin, possibly a predetermined margin. Under such circumstances, consistency is still found and the image capture is authenticated. If the comparison between these apparent and real movements reveals a difference that is too great between the estimated movements, the difference going beyond the acceptable error margin, then it is considered that there is no consistency between the movements, and the image capture is not authenticated.

The invention claimed is:

1. A method of authenticating the capture of an image of a three-dimensional entity, the method being implemented by a device and comprising the following steps:
  generating a series of images of the entity that is a portion of the individual to be identified by moving an optical sensor of a device around the entity;
  using data coming from at least one sensor having a fixed position relative to the optical sensor to generate an information representative of position of the optical sensor in a three-dimensional reference spatial frame;
  associating each image of the series of images with the information representative of the position of the optical sensor in three-dimensional reference spatial frame at the moment it generated the image, the position being determined relative to said three-dimensional reference spatial frame; and
  determining whether there is consistency between two images of the series by verifying whether there is consistency between:
    an apparent movement of the optical sensor as determined by comparing characteristic points visible in the two images;
    an estimated real movement of the optical sensor as determined by comparing information representative of three-dimensional positions of the optical sensor at the moments when it generated the two images; and
  searching for a match between:
    identification data generated from physical characteristics of the individual taken from at least one of the images of the series of images; and
    individual identification data contained in a previously registered database, the identification data previously registered in the database being associated with at least one identity of an individual; and then generating an identification indicator of the individual to be identified depending on said search for a match.

2. The method according to claim 1, wherein the information representative of positions of the optical sensor in three-dimensional reference spatial frame are generated with the help of:
- at least one inertial data sensor such as an accelerometer; or
- at least one rotation data sensor such as a gyro; or
- at least one orientation sensor such as a magnetic sensor forming a compass; or
- at least one level sensor for obtaining the angle of inclination of the optical sensor relative to a vertical axis; or
- at least one location sensor of a geolocation system such as the satellite geolocation system or for geolocation relative to fixed antennas.

3. The method of claim 1, wherein at least some of the characteristic points visible in the images and used for determining the apparent movement of the optical sensor between two images comprise physical characteristics of the individual to be identified, which characteristics are visible in at least these two images.

4. The method according to claim 2, wherein at least some of the physical characteristics of the individual to be identified that are used for determining the apparent movement of the optical sensor are also used for searching for a match between:
- the identification data generated from the physical characteristics of the individual taken from at least one of the images of the series of images; and
- the individual identification data contained in a previously registered database.

5. The method according to claim 1, wherein at least some of the characteristic points visible in the images and that are used for determining the apparent movement of the optical sensor comprise characteristics in the images that are visible in the background of the individual to be identified.

6. The method according to claim 1, wherein the database contains identification data for a plurality of individuals, the previously registered identification data being associated with respective identities of the individuals.

7. A portable computer terminal such as a smart phone, comprising:
- an optical sensor adapted to generate a series of images of an individual taken by moving the sensor around at least a portion of the individual; and
- at least one sensor having a fixed position relative to the optical sensor for generating information representative of the three-dimensional positions of the optical sensor relative to a given three-dimensional reference spatial frame;

wherein the portable computer terminal further comprises:
- means arranged to associate each image of a plurality of images in the series of images with information representative of the three-dimensional position of the optical sensor at the moment it generated the image, each position being determined with the help of said at least one sensor for generating information representative of the positions of the optical sensor; and
- means for determining consistency between two images of the series of images, these means being arranged to verify whether consistency exists between:
  - an apparent movement of the optical sensor determined by comparing characteristic points visible in these two images; and
  - an estimated real movement of the optical sensor determined by comparing said information representative of the three-dimensional positions of the optical sensor at the moment at which it generated these two images;

wherein the portable computer further comprises:
- read means for reading a database containing identification data for at least one individual;
- analysis means for analyzing the series of images and arranged to generate identification data from physical characteristics of at least one individual visible in at least one of the images of the series of images;
- means for searching for a match between:
  - individual identification data generated by the analysis means; and
  - identification data read from the database using said read means; and
- means for generating an identification indicator of the individual to be identified depending on said search for a match.

8. The portable computer terminal according to claim 7, further comprising means for conditioning the execution of at least one computer application as a function firstly of the consistency determined between the two images of the series of images and secondly as a function of the identification indicator of the individual.

9. The portable computer terminal according to claim 7, wherein said at least one sensor for generating information representative of the three-dimensional positions of the optical sensor is selected in a group of sensors composed of inertial data sensor, accelerometers, gyro sensor, orientation sensor, magnetic sensor forming a compass, level sensor for determining the angle of inclination of the optical sensor relative to a vertical axis, location sensor of a geolocation system, location sensor of a satellite geolocation system, location sensor of a geolocation system relative to fixed antennas remote from the portable computer terminal.

* * * * *